May 16, 1961 C. W. SUNDBERG 2,984,533
RACK MEANS FOR REFRIGERATORS AND THE LIKE
Filed Feb. 19, 1957 5 Sheets-Sheet 1

INVENTOR.
Carl W. Sundberg.
BY Robert H. Wendt
Attorney.

May 16, 1961  C. W. SUNDBERG  2,984,533
RACK MEANS FOR REFRIGERATORS AND THE LIKE
Filed Feb. 19, 1957  5 Sheets-Sheet 2

INVENTOR.
Carl W. Sundberg.
BY Robert H. Hendt.
Attorney

May 16, 1961
C. W. SUNDBERG
2,984,533
RACK MEANS FOR REFRIGERATORS AND THE LIKE
Filed Feb. 19, 1957
5 Sheets-Sheet 3
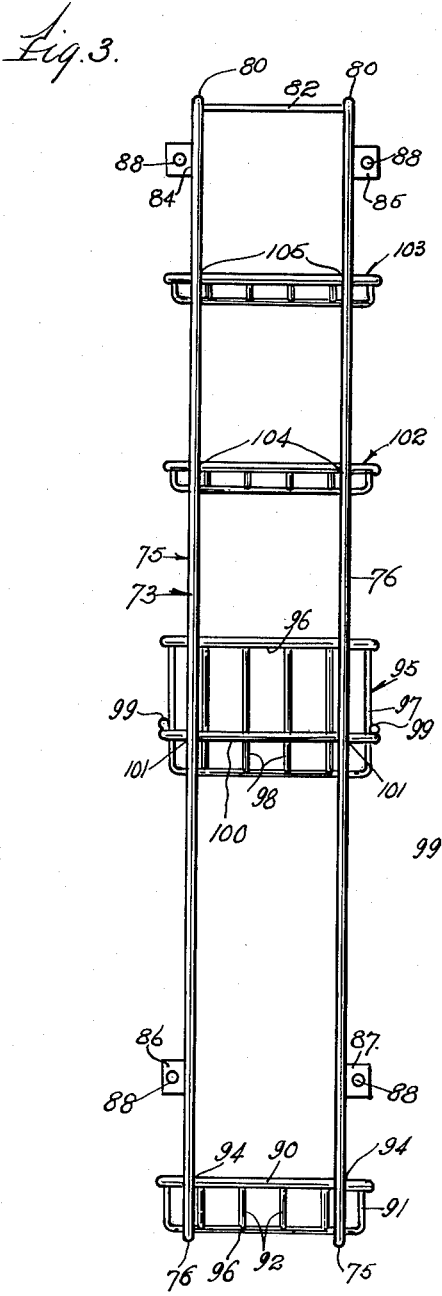
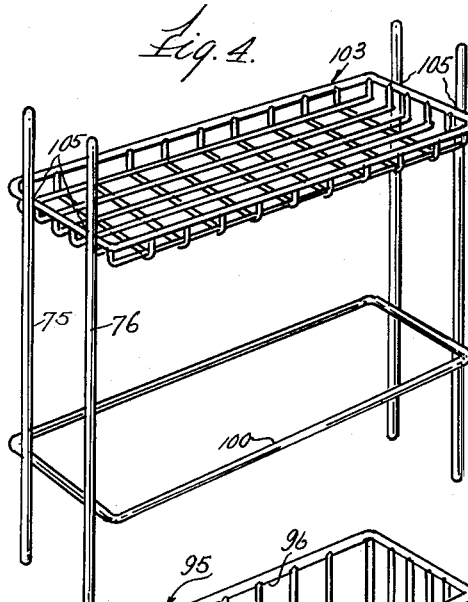
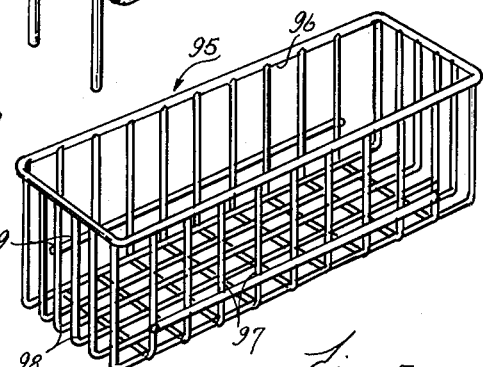
INVENTOR.
Carl W. Sundberg.
BY
Robert H. Wendt
Attorney May 16, 1961  C. W. SUNDBERG  2,984,533
RACK MEANS FOR REFRIGERATORS AND THE LIKE
Filed Feb. 19, 1957  5 Sheets-Sheet 4
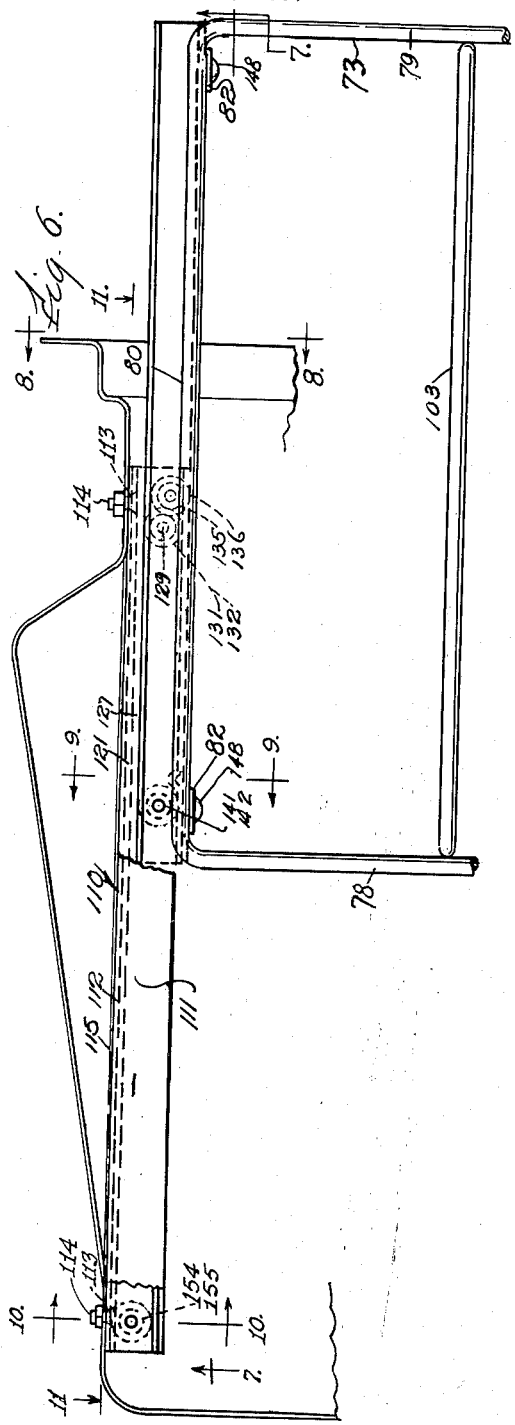
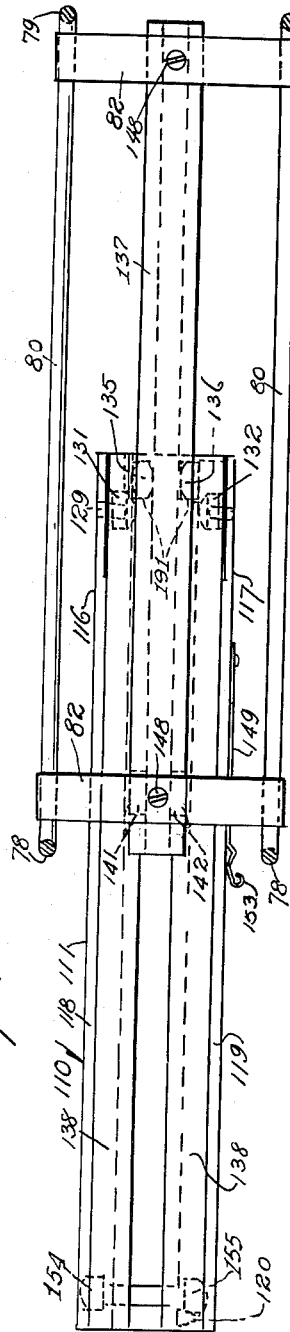
INVENTOR.
Carl W. Sundberg
BY Robert H. Wendt
Attorney.

May 16, 1961 C. W. SUNDBERG 2,984,533
RACK MEANS FOR REFRIGERATORS AND THE LIKE
Filed Feb. 19, 1957 5 Sheets-Sheet 5
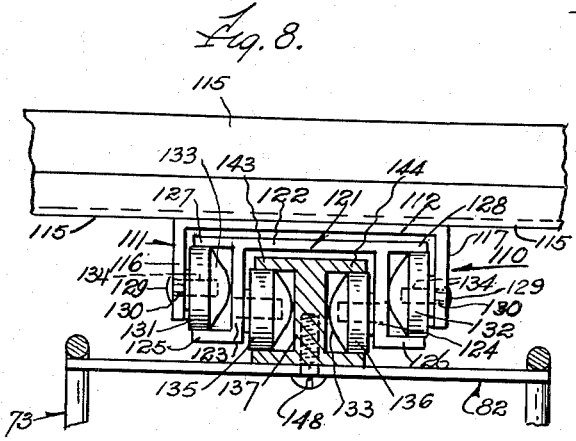
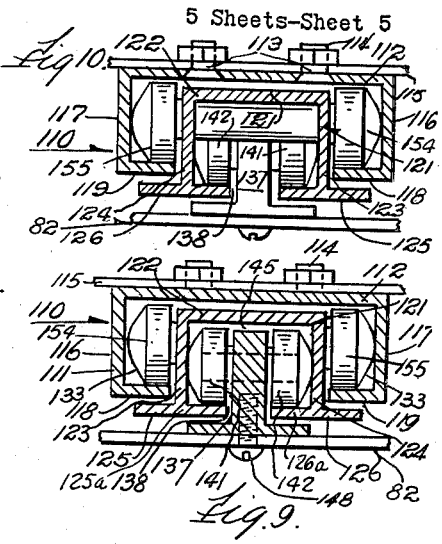
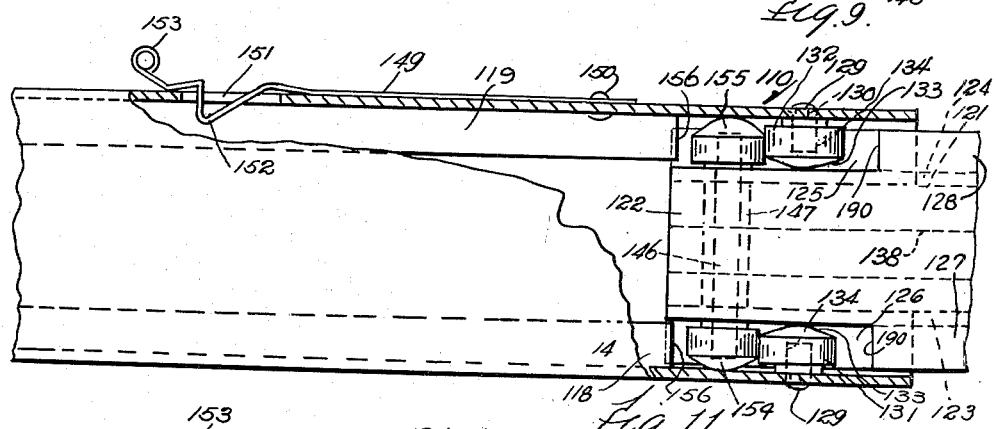
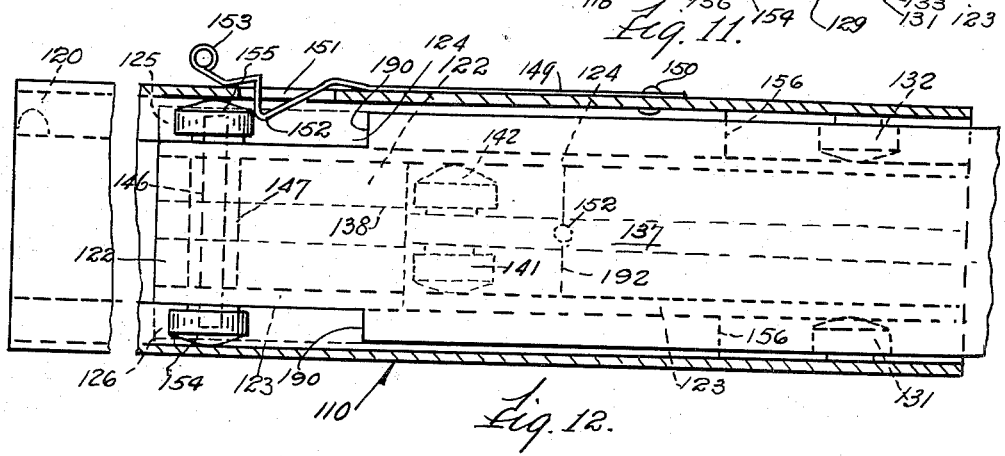
INVENTOR.
Carl W. Sundberg
BY Robert H. Wendt
Attorney

United States Patent Office 2,984,533
Patented May 16, 1961

2,984,533

RACK MEANS FOR REFRIGERATORS AND THE LIKE

Carl W. Sundberg, Royal Oak, Mich., assignor to Whirlpool Corporation, a corporation of Delaware Filed Feb. 19, 1957, Ser. No. 641,080

9 Claims. (Cl. 312—342)

The present invention relates to food storage shelves for refrigerators and the like, and is particularly concerned with the provision of improved food storage facilities for small articles which should be kept readily accessible.

One of the objects of the invention is the provision of an improved shelf assembly for household regriferators, including a plurality of horizontal shelves which terminate short of the liner wall at one side and a vertically installed rack, which includes a plurality of permanent and removable trays for use in storing small articles, such as eggs, bread, candy, salads, left-overs, medicines, milk bottles, soda bottles and the like.

Another object of the invention is the provision of an improved shelf arrangement for household refrigerators comprising a vertical rack which depends from the top of the cabinet and occupies the space between the top of the liner and the crisper drawers and which has a plurality of compartments which are open on all sides for the passage of cooling air so that the air may circulate freely on all sides of the rack and about the crispers.

Another object of the invention is the provision of an improved vertical storage tray of the class described which is mounted upon rollers and tracks so that it may be fully extended and so that it may also be removed as an entirety from the cabinet; and it may be accessible from both sides while still in the cabinet.

Another object of the invention is the provision of an improved food storage rack of the class described which is simple in construction, which includes a minimum number of parts, which may be manufactured cheaply, and which is adapted to be used for a long period of time without necessity for repair or replacement of any of its parts.

Other objects and advantages of the invention will be apparent from the following description and the accompanying drawings, in which similar characters of reference indicate similar parts throughout the several views.

Referring to the five sheets of drawings accompanying this specification,

Fig. 3 is a front elevational view of the rack of Fig. 2;

Fig. 4 is a fragmentary view in perspective of one of the upper permanent racks and the socket-like frame for supporting a removable basket;

Fig. 5 is a view in perspective of the removable basket;

Fig. 6 is a fragmentary side elevational view of the upper portion of the rack;

Fig. 7 is a fragmentary sectional view, taken on the plane of the line 7—7 of Fig. 6, which is located just below the top suspension of the rack;

Fig. 8 is a fragmentary sectional view, taken on the plane of the line 8—8 of Fig. 6;

Fig. 9 is a fragmentary vertical sectional view, taken on the plane of the line 9—9 of Fig. 6;

Fig. 10 is a fragmentary sectional view, taken on the plane of the line 10—10 of Fig. 6, looking in the direction of the arrows;

Fig. 11 is a fragmentary plan view with portions broken away, taken on the plane of the line 11—11 of Fig. 6, looking in the direction of the arrows, with the parts of the guide in position for removal of the unit from the cabinet;

Fig. 12 is a fragmentary sectional view with portions broken away, taken on the plane of line 11—11 of Fig. 6, looking in the direction of the arrows, with the parts in the position which they assume when the guide is latched to be retained in the cabinet.

Figure 1:
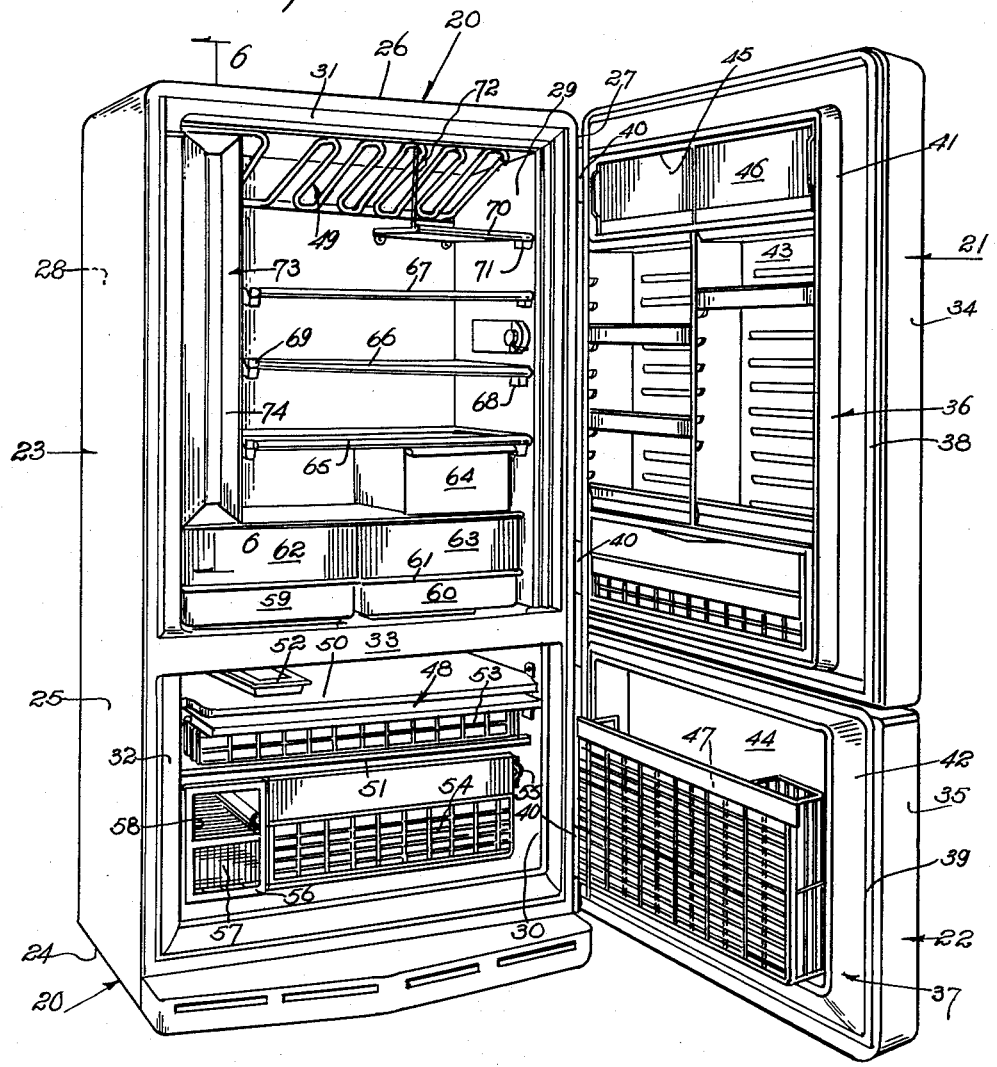
Fig. 1 is a front elevational view of a household refrigerator of the two door type, with the doors open, showing the improved shelf arrangements.

Referring to Fig. 1, 20 indicates in its entirety a household refrigerator cabinet provided with a pair of insulated doors 21, 22. The cabinet is preferably of the type having an outer metal shell 23, the bottom of which comprises a bottom panel 24 supporting the shell 23, which has a side wall 25, top wall 26, and side wall 27 formed of a single sheet of metal and having inwardly extending flanges secured to the bottom panel 24 and to back panel 28.

The shell supports a pair of inner box-like liners 29, 30, which are open at the front and separated from the shell and from each other by layers of heat insulation. The space between the shell and liner about the door opening is closed by breaker strips or breaker frames 31, 32; and the two liners are separated by an insulated partition having a front frame member 33.

The doors 21, 22 are of similar construction, each including an outer box-like metal shell 34 or 35 and an inner molded insulating panel 36 or 37 joined together at their adjacent edges, where they clamp the attaching flange of a rubber door seal 38 or 39.

Pairs of hinges 40 support each door on the shell 23. Each door is of suitable proportions for closing its compartment and effecting an air-tight seal. The upper and larger compartment formed by liner 29 is for the storage of food at above-freezing temperatures; and the lower compartment formed by liner 30 is for the storage of food at below-freezing temperatures.

The door panels 36 and 37 may be formed with inwardly extending walls 41, 42, forming recesses 43, 44 in the two doors for the storage of various articles. For example, the upper door compartment 45 with sliding doors 46 may be for the storage of butter and cheese.

The refrigerator is provided with the usual compressor, condenser, and capillary restrictor (not shown) for compressing and liquefying the refrigerant, which is carried first to a freezer evaporator 48 in the lower freezing compartment, and thereafter without restriction to the upper food storage evaporator 49, which is mounted at the top of the upper liner 29 in downwardly tilted position toward the back, for cooling the upper food storage compartment to an above-freezing temperature.

The lower evaporator 48 may comprise a pair of evaporator plates 50 and 51 in series; and the upper evaporator plate 50 is utilized for supporting a multiplicity of ice trays 52.

A shallow frozen food basket 53 is slidably supported on guides below the evaporator plate 50; and a second deeper frozen food basket 54 is slidably supported on guides 55 below the evaporator 51. A suitable frame 56 is provided for slidably supporting an ice cube storage bin 57 below a chamber 58 in which the inverted ice trays are inserted for releasing and discharging their cubes.

The upper above-freezing compartment may support a pair of slidable meat pans 59, 60 slidably mounted on guides and provided with a glass cover 61; and other guides may slidably support a pair of crisper pans 62, 63; and a vegetable drawer 64 may be slidably supported on guides carried by the first shelf 65.

The shelves 65, 66 and 67 comprise open, perforated, stamped sheet metal shelves supported from the liner wall on shelf supports 68 at the right and carried at the left by forwardly extending frames 69.

A shorter, half length shelf 70 is carried by shelf supports 71 and by a depending strut 72 extending from the top of the liner.

One of the most important features of the invention comprises the improved food storage arrangements, indicated at 73, and covered, in Fig. 1, by an elongated sheet metal or plastic cover 74.

Figure 2:
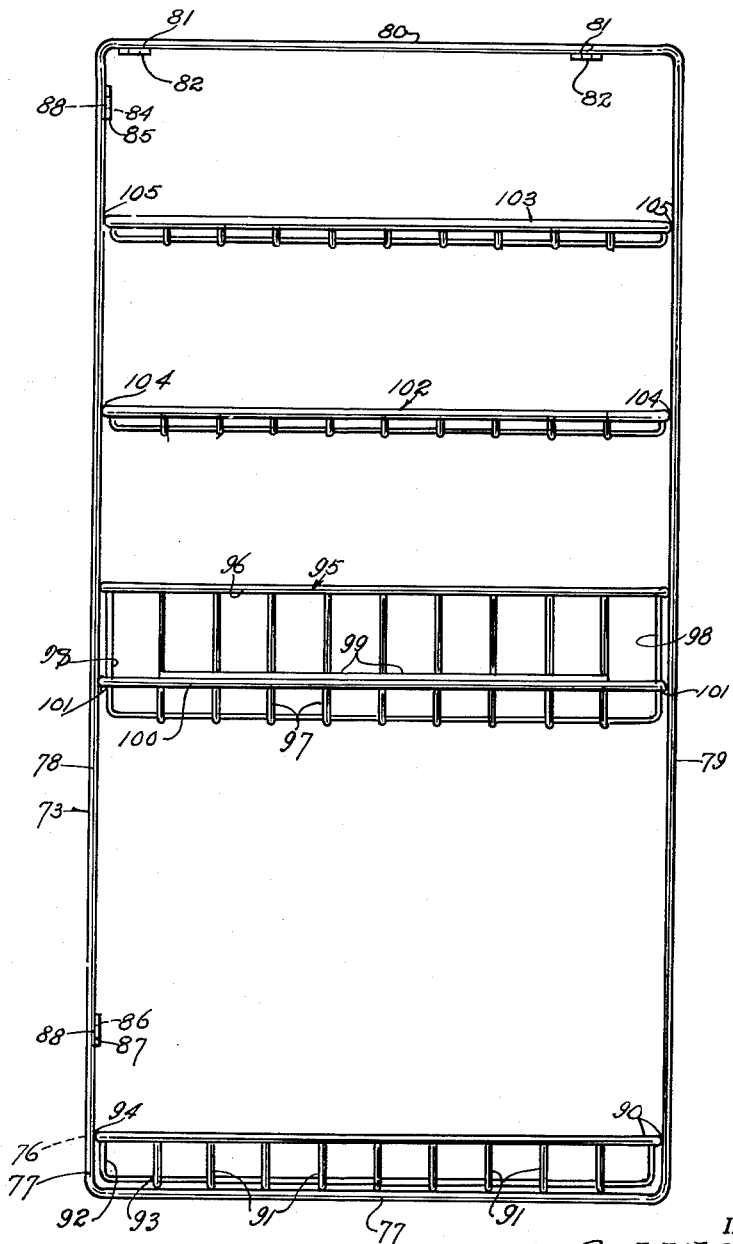
Fig. 2 is a side elevational view of a vertical food storage rack embodying the invention.

Referring to Fig. 2, this is a side elevational view of a food storage rack of the type which is concealed by cover 74 in Fig. 1. The rack 73 comprises a pair of rectangular side frame members 75, 76, each of which comprises a lower side 77, front side 78, rear side 79, and top side 80.

Each of the side frames 75, 76 may comprise one continuous length of wire, having its ends joined at a welded joint 81 at the top, where the two wire frames are welded to the transverse supporting metal straps 82. The front sides 78 of the two frames 75, 76 have four sheet metal attaching flanges 84–87 welded thereto and provided with apertures 88 for passing threaded bolts carried by the rear side of the cover 74 by means of which the cover is secured to the rack 73.

The two frames 75, 76 are secured together at the back by a bottom basket, which comprises an upper rectangular frame 90 with its ends welded together and a plurality of transversely extending U shaped wire members 91 and a plurality of longitudinally extending U shaped wire members 92, all of which have their upper ends secured by welding to the upper frame 90; and they may also be secured at their intersections 93.

The upper frame 90 may be welded to the side frames 75, 76 at the points where they cross, such as 94, thereby providing a permanent basket at the bottom for supporting milk bottles or beverage bottles.

The next basket 95 has an upper rectangular frame 96 and the transversely extending U-shaped wire members 97 and the longitudinally extending wire frame members 98, and is similar in construction to the basket 89, except that it is deeper and provided with a pair of wire supporting rails 99.

The rails 99 are welded to the side legs of the U-shaped members 97; and the rails rest upon a rectangular wire frame 100, which is of sufficient size to receive the basket 95, which is removably supported on the frame 100. The frame 100 is welded to the side frames 75, 76 at four points of intersection 101 at the front and back.

The next two baskets 102, 103 may, for example, be shallower and equally spaced from each other and welded to the side frames at the points of intersection 104, 105. Thus the rack 73 is provided with baskets of various depths, at least one of which may be removable from the rack for supporting various articles which it is desired to keep readily accessible.

As best seen in Fig. 6, the rack 73 is supported at the top from the metal straps 82 by means of a roller track assembly, generally indicated at 110. This track assembly includes an upper main channel 111, which has its yoke 112 disposed uppermost and provided at each end with a pair of apertures 113 for securement by screw bolts 114 (Figs. 9 and 10) to the top of the cabinet at the liner top 115.

The main channel 111 has a pair of depending flanges 116, 117 and a pair of inwardly turned bottom flanges 118, 119. The bottom flange 118 is deformed to provide a stop hump 120 (Fig. 7) at its rear end, limiting the inward motion of the other guide members. The inturned flanges 118, 119 terminate at 156 short of the front end of channel 111, as best seen in Fig. 11.

There is a second guide member 121, comprising an aluminum channel which has an upper yoke 122 of such width that it may be received in the channel 111. The yoke 122 has a pair of depending flanges 123, 124 and a pair of outwardly extending upper flanges 127 and 128 (Fig. 8) which terminate at 190 short of the rear end of guide member 121, as best seen in Figs. 11 and 12.

The depending flanges are provided at their lower ends with laterally outwardly extending flanges 125 and 126, respectively, and inwardly extending flanges 125a and 126a, respectively which terminate at 191 (Fig. 7) short of the front end of guide member 121. The flanges 125 and 126 extend laterally outwardly to the same extent as upper flanges 127, 128 of yoke 122.

The main channel 111 supports a pair of journal studs 129 at its forward end, each of said studs having reduced end portions 130 riveted in the depending flanges 116, 117. These journal studs support cylindrical nylon rollers 131, 132. The rollers have bores 134 which are closed at their inner ends for receiving the journal studs 129.

The rollers 131, 132 are adapted to roll along the underside of the second guide member 121 of the upper flanges 127, 128. This supports the second guide member 121 at the front end of main channel 111. Guide member 121 supports a pair of outer nylon rollers 154, 155 at its rear end.

These rollers 154, 155 roll along the underside of the yoke 112.

A third guide member 137 is provided in the form of an I beam. This I beam is adapted to be inserted inside the downwardly open portion 138 of the guide member 121.

The guide member 137 carries a pair of studs and rollers 141, 142 at the rear end thereof. The guide member 137 has laterally outwardly projecting top flanges 143, 144 which rest on a pair of inner rollers 135, 136 carried by guide member 121 at the forward end thereof. Top flanges terminate at 192 short of the rear end of guide member 137 (see Fig. 12).

The rear rollers 141, 142 are urged upward when the guide member 137 is extended forwardly to engage the underside of yoke 145 of the second guide member 121. The second guide member 121 utilizes the journal stud at its rear end in the form of a through pin 146, carrying a rubber sleeve 147 as a stop to limit inward motion of guide member 137 relative to guide member 121.

Inward motion of the second guide member 121 on the main channel 111 is limited in a rearward direction by the stop 120.

All the rollers are identical in construction and have partially spherical or rounded ends 133 contacting the confronting channel or guide member surfaces.

The I beam guide member 137 is secured by means of screw bolts 148 to the transverse metal straps 82. The main channel 111 carries a leaf spring 149 on one side by means of a rivet 150.

Leaf spring 149 projects into the channel through an aperture 151 by means of a V-shaped portion 152, having a curved handle 153. The V-shaped portion 152 is a stop for engaging the rollers 154, 155 carried by the guide member 121.

The spring 149 can be pulled outward by means of handle 153 to permit the rollers 154, 155 to pass the V-shaped stop 152.

Normally the second guide member 121 can only be extended forwardly half its length until its rollers 154, 155 engage the V-shaped stop 152. By moving the stop 152, the guide member 121 can be moved forward until its rollers 154, 155 clear the ends 156 of main channel flanges 118, 119 after which the guide members 137 and 121 can be removed as a unit from the main channel 111 by dropping the guide 121 (downwardly through the plane of the paper as seen in Fig. 11). As seen in Fig. 11, out turned flanges 127, 128 of guide member 121 terminate at 190 short of the ends of the guide member 121; clearance with rollers 131, 132 of guide 111 is provided to permit this removal.

The transverse pin 146 and rubber sleeve 147 prevent the two guide members 121 and 137 from coming apart by limiting the inward motion of the guide member 137. Thus, the guide members 121 and 137 are kept assembled with the rack 73, but members 121 and 137 together with the track may be removed in their entirety, leaving the main channel 111 in the liner.

By means of the main channel 111 carried by the liner, the two movable guide members 121 and 137 and the rack 73 may be pulled forward until the major part of the rack projects from the front of the liner.

By releasing the spring latch 152, the guide members 121 and 137 and the rack may be entirely removed from the refrigerator.

It will thus be observed that I have provided a conveniently removable rack mounted on rollers and extension guides so that the vertical rack can be pulled out from the front of the liner and exposed on three sides for insertion of bottles or other articles into the baskets carried by the rack 73.

Many different articles can be stored on this rack; and because of its roller and guide support they can be removed or arranged on the rack with the greatest facility.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. Rack means for use in a refrigerator or the like, comprising: a first channel arranged for downwardly opening installation and having an upper transverse portion and lower inturned flanges; a pair of rollers carried inwardly on the side of said first channel adjacent a forward end thereof and extending to below said flanges; a second, downwardly opening channel telescoping in said first channel and having an upper transverse portion, out turned upper and lower flanges, and inturned lower flanges; a first pair of rollers carried outwardly on the sides of said second channel adjacent a rear end thereof and extending to above said upper flanges; a second pair of rollers carried inwardly on the sides of said second channel adjacent the forward end thereof and extending to below the lower flanges thereof; an elongated carrier telescoping in said second channel and having out turned upper and lower flanges; and a pair of rollers carried outwardly on said carrier adjacent a rear end thereof and extending to above the upper flanges thereof, whereby said second channel moves through said first channel with said first pair of rollers of said second channel riding on the underside of said transverse portion of the first channel and said upper flanges of said second channel riding on said pair of rollers of the first channel, and said carrier moves through said second channel with said pair of rollers of the carrier riding on the underside of said transverse portion of the second channel and said upper flanges of the carrier riding on said second pair of rollers of the second channel.

2. Rack means for use in a refrigerator or the like, comprising: a first, one piece channel arranged for downwardly opening installation and having an upper transverse portion and lower inturned flanges; a pair of rollers carried inwardly on the sides of said channel adjacent a forward end thereof and extending to below said flanges; a second, downwardly opening, one piece channel telescoping in said first channel and having an upper transverse portion, out turned upper flanges, and inturned lower flanges; a first pair of rollers carried outwardly on the sides of said second channel adjacent a rear end thereof and extending to above said upper flanges; a second pair of rollers carried inwardly on the sides of said second channel adjacent the forward end thereof; and an elongated carrier telescoping in said second channel and having out turned upper flanges and a pair of rollers carried outwardly on said carrier adjacent a rear end thereof and extending to above the upper flanges thereof, whereby said second channel moves through said first channel with said first pair of rollers of said second channel riding on the underside of said transverse portion of the first channel and said upper flanges of said second channel riding on said pair of rollers of the first channel, and said carrier moves through said second channel with said pair of rollers of the carrier riding on the underside of said transverse portion of the second channel and said flanges of the carrier riding on said second pair of rollers of the second channel.

3. Rack means for use in a refrigerator or the like, comprising: a first channel arranged for downwardly opening installation and having an upper transverse portion, lower inturned flanges and a pair of rollers carried inwardly on the sides of said channel adjacent a forward end thereof and extending to below said flanges; a second, downwardly opening channel telescoping in said first channel and having an upper transverse portion, out turned upper flanges, inturned lower flanges, a pin extending transversely across the rear end of said second channel and projecting outwardly from the sides thereof; a first pair of rollers carried on the outwardly projecting portion of said pin and extending to above said upper flanges, and a second pair of rollers carried inwardly on the sides of said second channel adjacent the forward end thereof; and an elongated carrier telescoping in said second channel and having out turned upper flanges; a pair of rollers carried outwardly on said carrier adjacent a rear end thereof and extending to above the upper flanges thereof, whereby said second channel moves through said first channel with said first pair of rollers of said second channel riding on the underside of said transverse portion of the first channel and said upper flanges of said second channel riding on said pair of rollers of the first channel, and said carrier moves through said second channel with said pair of rollers of the carrier riding on the underside of said transverse portion of the second channel and said flanges of the carrier riding on said second pair of rollers of the second channel, said rear end of the carrier being arranged to abut said pin to limit the movement of said carrier rearwardly through said second channel to a disposition wherein the forward end of the carrier is aligned with the forward end of the second channel.

4. The rack means of claim 3 wherein a yieldable sleeve is mounted on said pin between said sides of the second channel to cushion the engagement of the carrier rear end therewith.

5. Rack means for use in a refrigerator or the like, comprising: a first channel arranged for downwardly opening installation and having an upper transverse portion and lower inturned flanges; a pair of rollers carried inwardly on the sides of said channel adjacent a forward end thereof and extending to below said flanges; a second, downwardly opening channel telescoping in said first channel and having an upper transverse portion and out turned upper flanges; and a pair of rollers carried outwardly on the sides of said second channel adjacent a rear end thereof and extending to above said upper flanges, whereby said second channel moves through said first channel with said first pair of rollers of said second channel riding on the underside of said transverse portion of the first channel and said upper flanges of said second channel riding on said pair of rollers of the first channel, said inturned flanges of the first channel terminating sufficiently short of the forward end thereof to be clear of the rear end of the second channel when the second channel is disposed fully forwardly to permit the second channel to be separated from the first channel when desired.

6. The rack means of claim 5 further including a releasable lock means associated with said channels for limiting forward movement of the second channel relative to the first channel so that the rear end of the second channel will not clear the forward termination of said flanges of the first channel.

7. The rack means of claim 6 wherein the lock means comprises a manually operable, spring biased member on said first channel projecting releasably into the path of forward movement of said first pair of rollers on said second channel.

8. Rack means for use in a refrigerator or the like, comprising: a first channel arranged for downwardly opening installation and having an upper transverse portion and lower inturned flanges; a pair of rollers carried inwardly on the sides of said channel adjacent a forward end thereof and extending to below said flanges; a second, downwardly opening channel telescoping in said first channel and having an upper transverse portion, out turned upper and lower flanges and inturned lower flanges; a first pair of rollers carried outwardly on the sides of said second channel adjacent a rear end thereof and extending to above said upper flanges; a second pair of rollers carried inwardly on the sides of said second channel adjacent the forward end thereof; an elongated carrier telescoping in said second channel and having out turned upper flanges; a pair of rollers carried outwardly on said carrier adjacent a rear end thereof and extending to above the upper flanges thereof, whereby said second channel moves through said first channel with said first pair of rollers of said second channel riding on the underside of said transverse portion of the first channel and said upper flanges of said second channel riding on said pair of rollers of the first channel, and said carrier moves through said second channel with said pair of rollers of the carrier riding on the underside of said transverse portion of the second channel and said flanges of the carrier riding on said second pair of rollers of the second channel, said pairs of rollers projecting from one of the channels or carrier on which they are mounted into engagement with a confronting surface of a laterally related one of the channels or carrier to preclude lateral movement of the channels and carrier relative to each other.

9. The rack means of claim 8 wherein the face of the projecting portion of each roller narrows outwardly, thereby providing a reduced area of the roller having only frictional engagement with the confronting surface.

References Cited in the file of this patent

UNITED STATES PATENTS

| | | |
|---|---|---|
| 769,024 | Ryan | Aug. 30, 1904 |
| 844,447 | Gautier | Feb. 19, 1907 |
| 1,005,055 | Miller | Oct. 3, 1911 |
| 1,212,992 | O'Brien | Jan. 16, 1917 |
| 1,321,167 | Voigt | Nov. 11, 1919 |
| 1,750,291 | Whetstone | Mar. 11, 1930 |
| 1,975,327 | Loney | Oct. 2, 1934 |
| 2,040,634 | Sekyra | May 12, 1936 |
| 2,157,611 | Jones | May 9, 1939 |
| 2,161,912 | Cossin | June 13, 1939 |
| 2,321,865 | Schweller | June 15, 1943 |
| 2,512,502 | Paschell | June 20, 1950 |
| 2,549,879 | Amore | Apr. 24, 1951 |
| 2,711,358 | Gussack | June 21, 1955 |